US008219391B2

(12) United States Patent
Preuss et al.

(10) Patent No.: US 8,219,391 B2
(45) Date of Patent: Jul. 10, 2012

(54) SPEECH ANALYZING SYSTEM WITH SPEECH CODEBOOK

(75) Inventors: Robert David Preuss, Sagamore Beach, MA (US); Darren Ross Fabbri, Arlington, MA (US); Daniel Ramsay Cruthirds, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1134 days.

(21) Appl. No.: 11/593,836

(22) Filed: Nov. 6, 2006

(65) Prior Publication Data

US 2007/0055502 A1 Mar. 8, 2007

Related U.S. Application Data

(63) Continuation-in-part of application No. 11/355,777, filed on Feb. 15, 2006.

(60) Provisional application No. 60/652,931, filed on Feb. 15, 2005, provisional application No. 60/658,316, filed on Mar. 2, 2005.

(51) Int. Cl.

| | |
|---|---|
| ***G10L 11/06*** | (2006.01) |
| ***G10L 19/00*** | (2006.01) |
| ***G10L 21/02*** | (2006.01) |
| ***G10L 15/20*** | (2006.01) |
| ***G10L 15/06*** | (2006.01) |
| ***G10L 21/04*** | (2006.01) |

(52) U.S. Cl. ........ 704/214; 704/219; 704/223; 704/226; 704/227; 704/228; 704/233; 704/243; 704/244; 704/500; 704/501; 704/502; 704/503

(58) Field of Classification Search .................. 704/219, 704/226, 227, 228, 233, 243, 244, 223, 500, 704/501, 502, 503

See application file for complete search history.

(56) References Cited

U.S. PATENT DOCUMENTS

| | | | | |
|---|---|---|---|---|
| 4,933,973 | A | | 6/1990 | Porter |
| 5,001,758 | A | | 3/1991 | Galand et al. |
| 5,027,404 | A | | 6/1991 | Taguchi |
| 5,255,339 | A | * | 10/1993 | Fette et al. .................... 704/200 |
| 5,459,815 | A | | 10/1995 | Aikawa et al. |
| 5,522,009 | A | | 5/1996 | Laurent |
| 5,553,194 | A | | 9/1996 | Seza et al. |
| 5,625,749 | A | | 4/1997 | Goldenthal et al. |
| 5,655,057 | A | | 8/1997 | Takagi |
| 5,680,508 | A | | 10/1997 | Liu |
| 5,732,394 | A | | 3/1998 | Nakadai et al. |

(Continued)

FOREIGN PATENT DOCUMENTS

EP 0 831 455 A2 3/1998

OTHER PUBLICATIONS

T. Wang, K. Koishida, V. Cuperman, A. Gersho, "A 1200 bps Speech coder based on MELP," ICASSP Proc. 2000.*

(Continued)

*Primary Examiner* — Douglas Godbold
*Assistant Examiner* — Edgar Guerra-Erazo
(74) *Attorney, Agent, or Firm* — Ropes & Gray LLP

(57) ABSTRACT

Presented herein are systems and methods for processing sound signals for use with electronic speech systems. Sound signals are temporally parsed into frames, and the speech system includes a speech codebook having entries corresponding to frame sequences. The system identifies speech sounds in an audio signal using the speech codebook.

46 Claims, 9 Drawing Sheets

U.S. PATENT DOCUMENTS

| | | | | |
|---|---|---|---|---|
| 5,745,872 | A * | 4/1998 | Sonmez et al. | 704/222 |
| 5,749,068 | A * | 5/1998 | Suzuki | 704/233 |
| 5,774,849 | A * | 6/1998 | Benyassine et al. | 704/246 |
| 5,778,342 | A | 7/1998 | Erell et al. | |
| 5,822,729 | A | 10/1998 | Glass | |
| 5,924,065 | A | 7/1999 | Eberman et al. | |
| 6,003,003 | A | 12/1999 | Asghar et al. | |
| 6,041,297 | A * | 3/2000 | Goldberg | 704/219 |
| 6,256,609 | B1 | 7/2001 | Byrnes et al. | |
| 6,278,972 | B1 | 8/2001 | Bi et al. | |
| 6,308,155 | B1 | 10/2001 | Kingsbury et al. | |
| 6,317,711 | B1 | 11/2001 | Muroi | |
| 6,347,297 | B1 | 2/2002 | Asghar et al. | |
| 6,381,569 | B1 | 4/2002 | Sih et al. | |
| 6,427,135 | B1 | 7/2002 | Miseki et al. | |
| 6,493,665 | B1 | 12/2002 | Su et al. | |
| 6,594,392 | B2 | 7/2003 | Santoni | |
| 6,658,112 | B1 * | 12/2003 | Barron et al. | 380/275 |
| 6,671,666 | B1 | 12/2003 | Ponting et al. | |
| 6,687,667 | B1 * | 2/2004 | Gournay et al. | 704/222 |
| 6,732,070 | B1 | 5/2004 | Rotola-Pukkila et al. | |
| 6,735,563 | B1 | 5/2004 | Bi | |
| 6,785,648 | B2 | 8/2004 | Menendez-Pidal et al. | |
| 6,820,052 | B2 * | 11/2004 | Das et al. | 704/208 |
| 6,832,190 | B1 | 12/2004 | Junkawitsch et al. | |
| 6,868,380 | B2 | 3/2005 | Kroeker | |
| 6,944,590 | B2 | 9/2005 | Deng et al. | |
| 6,950,796 | B2 | 9/2005 | Ma et al. | |
| 6,957,183 | B2 | 10/2005 | Malayath et al. | |
| 6,959,276 | B2 | 10/2005 | Droppo et al. | |
| 6,961,698 | B1 | 11/2005 | Gao et al. | |
| 6,965,860 | B1 | 11/2005 | Rees et al. | |
| 6,985,857 | B2 * | 1/2006 | Adut | 704/230 |
| 7,016,832 | B2 * | 3/2006 | Choi | 704/208 |
| 7,110,940 | B2 * | 9/2006 | Smith et al. | 704/200 |
| 7,127,254 | B2 * | 10/2006 | Shvodian et al. | 455/450 |
| 7,260,520 | B2 | 8/2007 | Henn et al. | |
| 7,260,527 | B2 | 8/2007 | Koshiba | |
| 7,266,494 | B2 | 9/2007 | Droppo et al. | |
| 7,286,982 | B2 * | 10/2007 | Gersho et al. | 704/223 |
| 7,315,815 | B1 | 1/2008 | Gersho et al. | |
| 7,424,426 | B2 | 9/2008 | Furui et al. | |
| 7,668,712 | B2 * | 2/2010 | Wang et al. | 704/219 |
| 2001/0001141 | A1 | 5/2001 | Sih | |
| 2002/0038210 | A1 | 3/2002 | Yajima et al. | |
| 2002/0052734 | A1 * | 5/2002 | Unno et al. | 704/207 |
| 2003/0033143 | A1 | 2/2003 | Aronowitz | |
| 2003/0055639 | A1 | 3/2003 | Rees | |
| 2004/0236572 | A1 | 11/2004 | Bietrix et al. | |
| 2005/0075869 | A1 * | 4/2005 | Gersho et al. | 704/223 |
| 2005/0265399 | A1 | 12/2005 | El-Maleh et al. | |

OTHER PUBLICATIONS

S. Srinivasan, J. Samuelsson, W.B. Kleijn: Speech enhancement using a-priori information with classified noise codebooks, Proc. EUSIPCO (2004) pp. 1461-1464.*

Preuss R. D., "Testing Spectral Hypotheses in Noise", Third ASSP Workshop on Spectrum Estimation and Modeling, IEEE, 1986, pp. 125-128.*

S. Roucos et al.,"Segment Quantization for Very-Low-Rate Speech Coding" IEEE Intl Conf. Acoust. Speech Signal Processing, Paris, France., pp. 1565-1568 (1982).

Roucos, S., et al., "A Segment Vocoder Algorithm for Real-Time Implementation", Acoustics, Speech and Signal Processing, IEEE International Conference on ICASSP'87, pp. 1949-1952 Apr. 1987.

Irino T., et al., "Evaluation of a Speech Recognition / Generation Method Based on HMM and Straight", 4 pp. ICSLP, Denver, Colorado (2002).

Chamberlain, M.W., "A 600 BPS MELP Vocoder for Use on HF Channels" Communications Conference, vol. 1, pp. 447-453, (2001).

Hansen, J. H. L., "Constrained Iterative Speech Enhancement with Application to Speech Recognition", IEEE Transactions on Signal Processing, vol. 39. No. 4, pp. 795-805 (1991).

Shiraki, Y., "LPC Speech Coding Based on Variable-Length Segment Quantization", IEEE Transaction on Acoustics, Speech and Signal Processing, vol. 36, No. 9, pp. 1437-1444, (1988).

Wang, Tian., et al., "Stanag 4591—the winner! A 1200/2400 BPS Coding Suite Based on MELP" (Mixed Excitation Linear Prediction) The Institute of Engineering & Technology, NC3A Workshop on Starnag 4591,The Hague, Powerpoint Presentation, pp. 1-17, Oct. 18, 2002.

Juang B.H., et al., 37 Hidden Markov Models for Speech Recognition, TECHNOMETRICS, vol. 33, No. 3, Aug. 1991.

Picone, J., et al., "A Phonetic Vocoder", Acoustics, Speech, and Signal Processing, ICASSP'89 International Conference, pp. 580-583, vol. 1, (1989).

Ostendorf, M. et al., "A Stochastic Segment Model for Phoneme-based Continuous Speechrecognition" Acoustics, Speech, and Signal Processing, vol. 37, :12, pp. 1857-1869, (1989).

Raj, Bhiksha., et al., "Inference of Missing Spectrographic Features for Robust Speech Recognition", ICSLP '98, pp. 1491-1494 (1998).

Office action issued on Nov. 28, 2008 for U.S. Appl. No. 11/355,777.

Brady, et al. "Multisensor MELPe using parameter substitution", Proc. Int. Conf. Acoustics, Speech, and Signal Processing, Montreal, Canada. 2004.

Chung Y-J: "Adaptation method using expectation-maximisation for noisy speech recognition" Electronics Letters, IEE Stevenage, GB, vol. 38, No. 13, pp. 666-667, Jun. 20, 2002.

Collura and Rahikka, "Interoperable Secure Voice Communications in Tactical Systems," IEEE Colloq. on Speech Coding Algorithms for Radio Channels, 2000.

Collura, "Speech Enhancement and Coding in Harsh Acoustic Noise Environments," IEEE Speech Coding Workshop-99, Porvoo, Finland, 1999.

Gong Y., "Speech recognition in noisy environments: A survey" Speech Communication, Elsevier Science Publishers, vol. 16, No. 3, pp. 261-291, Apr. 3, 1995.

McKinley B. L., et al., "Noise model adaptation in model based speech enhancement" IEEE International Conference on Acoustics, Speech, and Signal Processing—Proceedings. (ICASSP). , vol. 2. Conference 21, pp. 633-636, May 7, 1996.

MELPE Vocoder Fact Sheet, Compandent, Inc., Speech and Audio Compression Technologies, 2004.

Srinivasan et al. "Codebook-Based Bayesian Speech Enhancement", Proc. Int. Conf. Acoustics, Speech, and Signal Processing, Philadelphia, PA. 2005.

Street and Collura, "Interoperable voice communications: test and selection of STANAG 4591," RTO-IST conf. on Military communications, Warsaw, Poland, 2001.

* cited by examiner

SEGMENT LENGTH: 180ms

| PARAMETERS | BITS |
| --- | --- |
| VOICING CODEBOOK ENTRY INDEX | 15 |
| SPEECH CODEBOOK ENTRY INDEX (3 STAGES) | 39 |
| TOTAL BITS / SEGMENT | 54 |
| DATA RATE (BPS) | 300 |

700

SEGMENT LENGTH: 90ms

| PARAMETERS | BITS |
| --- | --- |
| VOICING CODEBOOK ENTRY INDEX | 15 |
| SPEECH CODEBOOK ENTRY INDEX (3 STAGES) | 39 |
| TOTAL BITS / SEGMENT | 54 |
| DATA RATE (BPS) | 600 |

730

SEGMENT LENGTH: 90ms

| PARAMETERS | BITS |
| --- | --- |
| VOICING CODEBOOK ENTRY INDEX | 15 |
| SPEECH CODEBOOK ENTRY INDEX (6 STAGES) | 75 |
| TOTAL BITS / SEGMENT | 90 |
| DATA RATE (BPS) | 1000 |

760

Figure 7

SPEECH ANALYZING SYSTEM WITH SPEECH CODEBOOK

CROSS REFERENCE TO RELATED APPLICATIONS

This application is a continuation-in-part of U.S. patent application Ser. No. 11/355,777, filed Feb. 15, 2006, entitled "Speech Analyzing System with Adaptive Noise Codebook," the entirety of which is hereby incorporated by reference, which claims priority under 35 U.S.C. §119(e) to U.S. Provisional Application No. 60/652,931 titled "Noise Robust Vocoder: Advanced Speech Encoding" filed Feb. 15, 2005, and U.S. Provisional Application No. 60/658,316 titled "Methods and Apparatus for Noise Robust Vocoder" filed Mar. 2, 2005, the entirety of which are also hereby incorporated by reference.

GOVERNMENT CONTRACT

The U.S. Government has a paid-up license in this invention and the right in limited circumstances to require the patent owner to license others on reasonable terms as provided for by the terms of Contract No. W15P7T-05-C-P218 awarded by the United States Army Communications and Electronics Command (CECOM).

BACKGROUND

Speech analyzing systems match a received speech signal to a stored database of speech patterns. One system, a speech recognizer, interprets the speech patterns, or sequences of speech patterns to produce text. Another system, a vocoder, is a speech analyzer and synthesizer which digitally encodes an audio signal for transmission. The audio signal received by either of these devices often includes environmental noise. The noise acts to mask the speech signal, and can degrade the quality of the output speech of a vocoder or decrease the probability of correct recognition by a speech recognizer. It would be desirable to filter out the environmental noise to improve the performance of a vocoder or speech recognizer.

SUMMARY

Presented herein are systems and methods for processing sound signals for use with electronic speech systems. Sound signals are temporally parsed into frames, and the speech system includes a speech codebook having entries corresponding to frame sequences. The system identifies speech sounds in an audio signal using the speech codebook.

According to one aspect, the invention relates to a method for processing a signal. The method includes receiving an input sound signal and temporally parsing the input sound signal into input frame sequences. The method also includes providing a speech codebook including a plurality of entries corresponding to reference frame sequences. Phones are identified within the input sound signal based on a comparison of an input frame sequence with a plurality of the reference frame sequences, and the phones are encoded. The received input sound signal may include speech and it may include environmental noise. Encoding the phones may include encoding the identified phones as a digital signal having a bit rate of less than 2500 bits per second.

The method includes temporally parsing the input sound signal into input frame sequences of at least two input frames. An input frame represents a segment of a waveform of the input sound signal. The segment of the waveform represented by an input frame in one embodiment is represented by a spectrum. In another embodiment, an input frame includes the segment of the waveform of the input sound signal it represents. In various embodiments, the input frame sequence may include sequences of two frames, three frames, four frames, five frames, six frames, seven frames, eight frames, nine frames, ten frames, or more than ten frames. According to one embodiment, the at least two input frames are derived from temporally adjacent portions of the input sound signal. According to another embodiment, the at least two input frames are derived from temporally overlapping portions of the input sound signal. In one embodiment, the method includes identifying pitch values of the input frames, and may include encoding the identified pitch values.

In some embodiments, temporally parsing includes parsing the input sound signal into variable length frames. A variable length frame may correspond to a phone, or, it may correspond to a transition between phones. In various embodiments, the input sound signal may be temporally parsed into frame sequences of at least 3 frames, at least 4 frames, at least 5 frames, at least 6 frame, at least 7 frames, at least 8 frames, at least 9 frames, at least 10 frames, at least 11 frames, at least 12 frames, at least 15 frames, or more than 15 frames.

The method also includes providing a speech codebook including a plurality of entries corresponding to reference frame sequences. A reference frame sequence is derived from an allowable sequence of at least two reference frames. A reference frame represents a segment of a waveform of a reference sound signal. The segment of the waveform represented by a reference frame may be represented by a spectrum. In some embodiments, a reference frame may include the segment of the waveform of the reference sound signal that it represents. In various embodiments, the reference frame sequence may include sequences of two frames, three frames, four frames, five frames, six frames, seven frames, eight frames, nine frames, ten frames, or more than ten frames. According to one embodiment, the at least two reference frames are derived from temporally adjacent portions of a speech signal. According to another embodiment, the at least two reference frames are derived from temporally overlapping portions of a speech signal. The set of allowable sequences of reference frames may be determined based on sequences of phones that are formable by the average human vocal tract. Alternatively, the set of allowable sequences of reference frames may be determined based on sequences of phones that are permissible in a selected language. The selected language may be English, German, French, Spanish, Italian, Russian, Japanese, Chinese, Korean, or any other language.

In some embodiments, the method also includes providing a noise codebook, selecting a noise sequence from the noise codebook entries, and identifying phones based on a comparison of an input frame sequence with the at least one noise sequence. The noise codebook includes a plurality of noise codebook entries corresponding to frames of environmental noise. The selected noise sequence may include two noise codebook entries. The two noise codebook entries may be two different noise codebook entries, or they may be the same noise codebook entry. In other embodiments, the noise sequence may include three, four, five, six, seven, eight, nine, ten, or more than ten noise codebook entries.

In another aspect, the invention relates to a device including a receiver, a first processor, a first memory, a second processor, and a third processor. The receiver may receive an input sound signal including speech and environmental noise.

The first processor temporally parses the input sound signal into input frame sequences of at least two input frames. The first memory stores a plurality of speech codebook entries corresponding to reference frame sequences. The second processor identifies phones within the speech based on a comparison of an input frame sequence with a plurality of the reference frame sequences. The third processor encodes the phones, for example, as a digital signal having a bit rate of less than 2500 bits per second. In various embodiments, at least two of the first processor, the second processor, and the third processor are the same processor.

The first processor temporally parses the input sound signal into input frame sequences of at least two input frames, wherein an input frame represents a segment of a waveform of the input sound signal. The segment of the waveform represented by an input frame may be represented by a spectrum. In some embodiments, an input frame includes the segment of the waveform of the input sound signal it represents. The first processor may create the input frames from temporally adjacent portions of the input sound signal, or it may create the input frames from temporally overlapping portions of the input sound signal. The first processor may temporally parse the input sound signal into variable length input frames, and one of the variable length input frames may correspond to a phone or a transition between phones. The first processor may temporally parse the input sound signal into input frame sequences of one of at least 3 frames, at least 4 frames, at least 5 frames, at least 6 frames, at least 7 frames, at least 8 frames, at least 9 frames, at least 10 frames, at least 11 frames, at least 12 frames, at least 15 frames, or more than 15 frames. The device may include a fourth processor for identifying pitch values of the at least two input frames.

The first memory may store a plurality of speech codebook entries corresponding to reference frame sequences. A reference frame sequence is derived from an allowable sequence of at least two reference frames. A reference frame represents a segment of a waveform of a reference sound signal. The segment of the waveform represented by reference frame may be represented by a spectrum. In some embodiments, a reference frame includes the segment of the waveform of the reference sound signal it represents. The allowable sequences may be based on sequences of phones predetermined to be formable by the average human vocal tract. In another embodiment, the allowable sequences are based on sequences of phones predetermined to be permissible in a selected language. The selected language may be English, German, French, Spanish, Italian, Russian, Japanese, Chinese, Korean, or any other language. The reference frame sequences may be created from reference frames derived from overlapping portions of a speech signal.

In some embodiments, the device may also include a second memory for storing a plurality of noise codebook entries, and a fourth processor for selecting at least one noise sequence of noise codebook entries. The plurality of noise codebook entries may correspond to spectra of environmental noise. The second processor may identify phones within the speech based on a comparison of the spectra corresponding to a frame sequence with the at least one noise sequence.

BRIEF DESCRIPTION OF THE FIGURES

The foregoing and other objects and advantages of the invention will be appreciated more fully from the following further description thereof, with reference to the accompanying drawings. These depicted embodiments are to be understood as illustrative of the invention and not as limiting in any way.

FIG. 7 shows three tables with exemplary bit allocations for signal encoding, according to an illustrative embodiment of the invention.

DETAILED DESCRIPTION

To provide an overall understanding of the invention, certain illustrative embodiments will now be described, including systems, methods and devices for providing improved analysis of speech, particularly in noisy environments. However, it will be understood by one of ordinary skill in the art that the systems and methods described herein can be adapted and modified for other suitable applications and that such other additions and modifications will not depart from the scope hereof.

Figure 1:
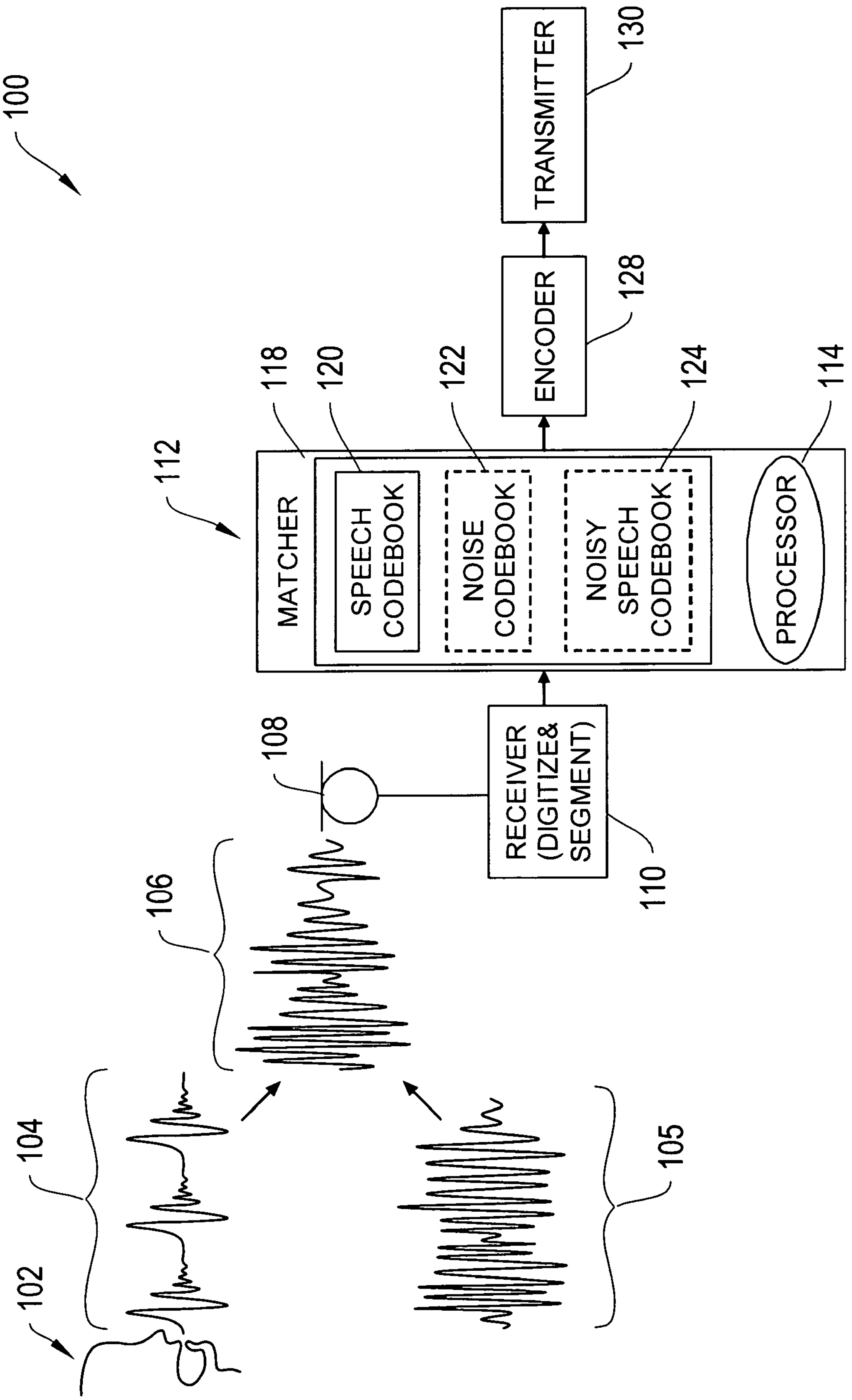
FIG. 1 is a diagram of a speech encoding system, according to an illustrative embodiment of the invention.

FIG. 1 shows a high level diagram of a system 100 for encoding speech. The speech encoding system includes a receiver 110, a matcher 112, an encoder 128, and a transmitter 130. The receiver 110 includes a microphone 108 for receiving an input audio signal 106. The audio signal may contain noise 105 and a speech waveform 104 generated by a speaker 102. The receiver 110 digitizes the audio signal, and temporally segments the signal. In one implementation, the input audio signal is segmented into frames of a predetermined length of time, for example, between 20-25 ms. In one particular implementation, the audio signal is segmented in 22.5 ms frames. In other implementations, the frame may be about 5 ms, about 7.5 ms, about 10 ms, about 12.5 ms, about 15 ms, about 18 ms, about 20 ms, about 25 ms, about 30 ms, about 35 ms, about 40 ms, about 50 ms, about 60 ms, about 75 ms, about 100 ms, about 125 ms, about 250 ms or about 500 ms. In some embodiments, the frame length may be altered dynamically based on the characteristics of the speech. For example, using a variable frame length, a 10 ms frame may be used for a short sound, such as the release burst of a plosive, while a 250 ms frame may be used for a long sound, such as a fricative. A segment or block of the audio signal may comprise a plurality of temporally contiguous or overlapping frames, and may have a variable duration or a fixed duration. The receiver 110 sends the digitized signal to a matcher 112.

The matcher 112, which identifies the speech sounds in an audio signal, may include a processor 114 and at least one database 118. The database 118 stores a speech codebook 120 and, optionally, a noise codebook 122. The database 118 may also store a noisy speech codebook 124. According to alternative embodiments, the codebooks 120, 122, and 124 may be stored in separate databases. The processor 114 creates the noisy speech codebook 124 as a function of the speech codebook 120 and the noise codebook 122, as described in greater detail with respect to FIGS. 2 and 3. The noisy speech codebook 124 includes a plurality of noisy speech templates.

Alternatively, the processor 114 may create a single noisy speech template. The processor 114 matches a segment of the audio signal to a noisy speech template. The matching noisy speech entry information is sent to an encoder 128. The encoding process is described further in relation to FIG. 5. The encoder 128 encodes the data and sends it to a transmitter 130 for transmission. The functionality of the matcher 112 and the encoder 128 can be implemented in software, using programming languages known in the art, hardware, e.g. as digital signal processors, application specific integrated circuits, programmable logic arrays, firmware, or a combination of the above.

Figure 2A:
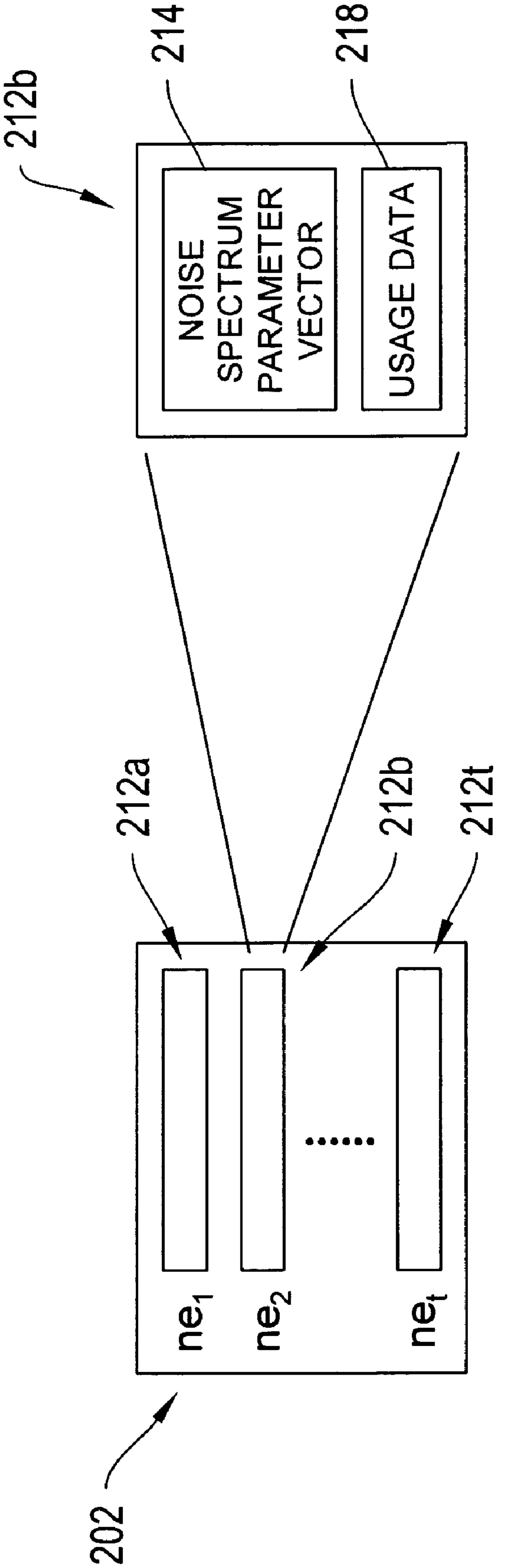
FIGS. 2A-2C are block diagrams of a noise codebook, a voicing codebook, and a speech codebook, of a vocoding system, according to an illustrative embodiment of the invention.

FIG. 2A is a block diagram of a noise codebook 202, such as the noise codebook 122 of the matcher 112 of the speech encoding system 100 of FIG. 1. The noise codebook 202 contains t (where t is an integer) noise entries 212*a*-212*t* (generally "noise entries 212"). Each noise entry 212 represents a noise sound. The noise entries 212 are continuously updated, as described below with respect to FIG. 6, such that the noise entries 212 represent the most recent and/or frequent noises detected by the speech encoding system 100.

An enlargement of one exemplary noise entry, noise entry 212*b*, is also shown in FIG. 2A. The noise entry 212*b* may store a waveform representing a sound, or it may store a sequence of parameter values 214, collectively referred to as a "parameter vector," describing a corresponding noise. The parameter values 214 may include, for example, a frequency vs. amplitude spectrum or a spectral trajectory. According to one embodiment, the parameter values 214 represent an all-pole model of a spectrum. The parameter values 214 may also specify one or more of duration, amplitude, frequency, and gain characteristics of the noise. In addition, the parameter values 214 may also specify one or more of gain and predictor coefficients, gain and reflection coefficients, gain and line spectral frequencies, and autocorrelation coefficients.

According to various embodiments, the noise codebook 202 may contain 2, 4, 8, 16, 32, 64, 128, 256, 512, 1024, 2048, 4096, 8192, or 16384 noise entries 212. Additionally, the codebook may contain any integer number of noise entries. According to a preferred embodiment, the noise codebook 202 contains 20 noise entries 212. According to an alternative embodiment, each noise codebook entry represents a plurality of frames of noise.

Additionally, each noise entry 212 includes a usage data counter 218. In one implementation, the usage data counter 218 counts how many times the corresponding noise entry 212 has been adapted. According to one embodiment, the usage data counters 218 of noise entries 212 that have never been adapted or replaced store a value of zero, and every time a noise entry 212 is adapted, the usage data counter 218 is incremented by one. When a noise entry 212 is replaced, the corresponding usage data counter 218 is reset to one. In another embodiment, when a noise entry 212 is replaced, the corresponding usage data counter 218 is reset to zero. In an alternative embodiment, the usage data counters 218 track how many times the noise entries 212 have been selected.

Figure 2B:
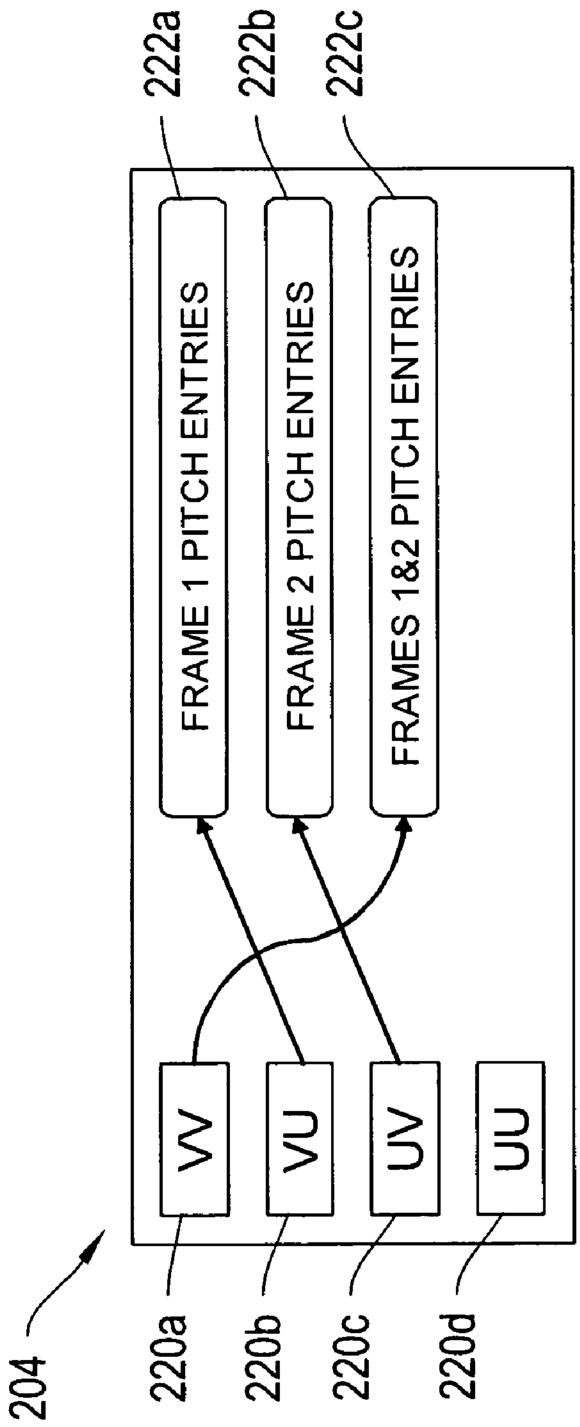

FIG. 2B is a block diagram of a voicing codebook 204, which may also be included in the matcher 112 of the speech encoding system 100 of FIG. 1. The voicing codebook 204 includes voicing entries 220 representing different voicing patterns. Speech sounds can generally be classified as either voiced or unvoiced. A voicing pattern corresponds to a particular sequence of voiced and unvoiced speech sounds. Thus, for voicing patterns characterizing sequences of two speech sounds, there are 4 possible voicing patterns: voiced-voiced (vv), voiced-unvoiced (vu), unvoiced-voiced (uv), and unvoiced-unvoiced (uu). For voicing patterns characterizing sequences of three speech sounds, there are 8 possible patterns: vvv, vvu, vuv, vuu, uvv, uvu, uuv, uuu. However, sequences vuv and uvu can be ignored, because a speech signal does not typically include such a short period of voicing or devoicing, as would be represented by the middle frame in these sequences. According to an alternative embodiment, the voicing codebook 204 may contain only 2 entries 220, each representing one frame of sound, i.e. one "voiced" entry and one "unvoiced" entry. According to other embodiments, the voicing codebook 204 may contain 10 voicing entries 220 representing 4 frames each or 68 voicing entries representing 8 frames each (note again, that some possible voicing patterns can be ignored as explained above).

The illustrative voicing codebook 204 includes voicing entries 220*a*-220*d* corresponding to four sound voicing patterns. Each voicing entry 220*a*-220*d* corresponds to a two frame voicing pattern. Entry 220*a*, a "voiced-voiced" voicing entry, corresponds to two frames of a voiced signal. Entry 220*b*, a "voiced-unvoiced" voicing entry, corresponds to a first frame of a voiced signal followed by a second frame of an unvoiced signal. Entry 220*c*, an "unvoiced-voiced" voicing entry, corresponds to a first frame of an unvoiced signal followed by a second frame of a voiced signal. Entry 220*d*, an "unvoiced-unvoiced" voicing entry, corresponds to two frames of an unvoiced signal. According to one feature, the "unvoiced-unvoiced" voicing entry may represent two frames of unvoiced speech, two frames of speech-absent environmental noise, or one frame of unvoiced speech and one frame of speech-absent noise. According to one embodiment, two consecutive frames of the input signal are matched with one of the four entries 220*a*-220*d*. According to an alternative embodiment, the voicing codebook 204 includes a fifth entry representing two frames of speech-absent environmental noise. In this embodiment, the "unvoiced-unvoiced" voicing entry represents two frames, including at least one frame of unvoiced speech.

The voicing codebook 204 also contains pitch entries 222*a*-222*c* corresponding to pitch and pitch trajectories. Pitch entries 222*a* contain possible pitch values for the first frame, corresponding to the "voiced-unvoiced" voicing entry 220*b*. Pitch entries 222*b* contain possible pitch values for the second frame, corresponding to the "unvoiced-voiced" voicing entry 220*c*. Pitch entries 222*c* contain pitch values and pitch trajectories for the first and second frames, corresponding to the "voiced-voiced" voicing entry 220*d*. The pitch trajectory information includes how the pitch is changing over time (for example, if the pitch is rising or falling). According to one embodiment, pitch entries 222*a* include 199 entries, pitch entries 222*b* include 199 entries, and pitch entries 222*c* include 15,985 entries. However, according to alternative embodiments, the pitch entries 222*a*, 222*b*, and 222*c* may include 50, 100, 150, 250, 500, 1000, 2500, 5000, 7500, 10000, 12500, 15000, 17500, 20000, 25000, or 50000 entries.

Figure 2C:
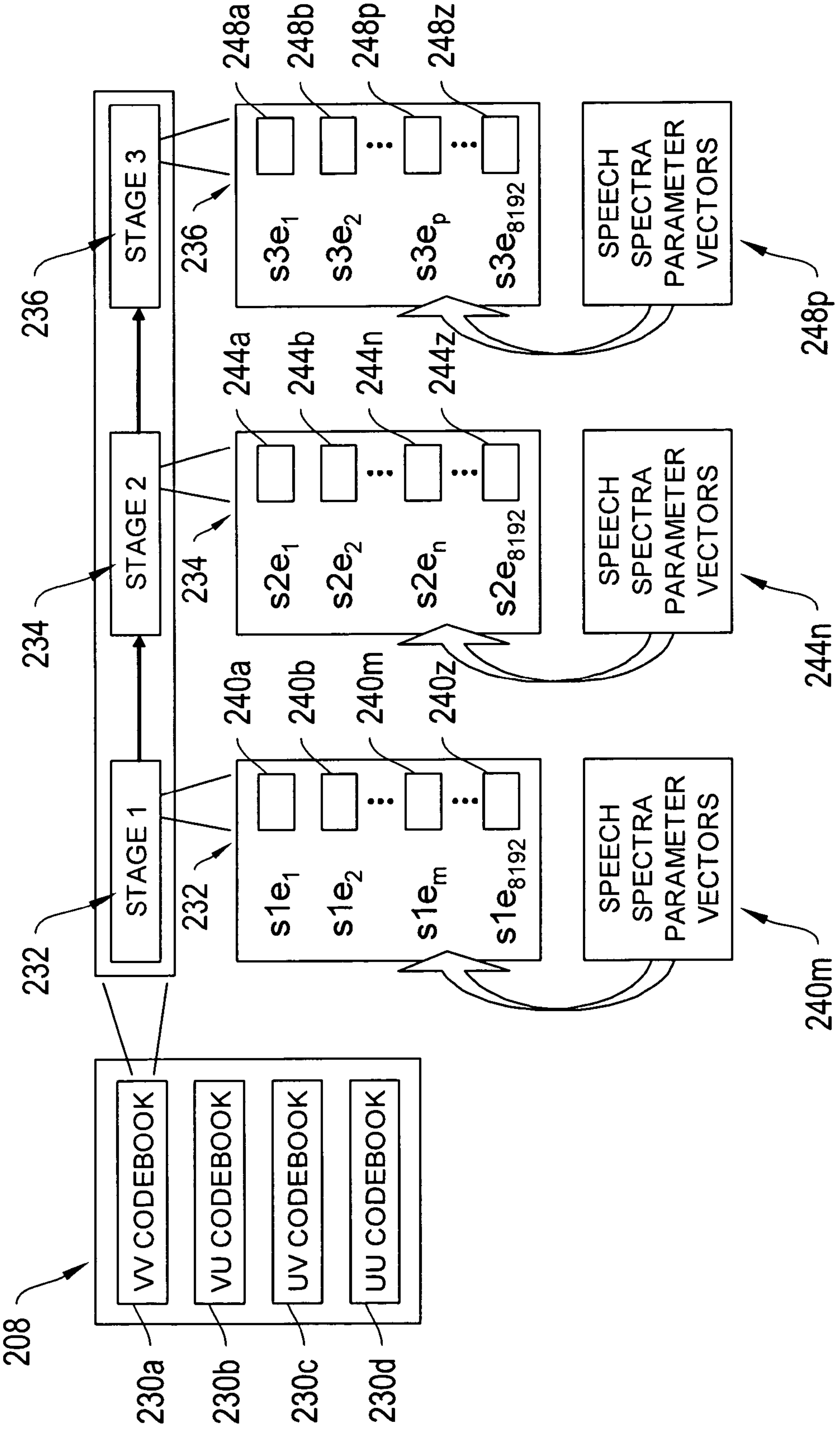

FIG. 2C is a block diagram of a speech codebook 208 of the matcher 112 of the speech encoding system 100 of FIG. 1. The speech codebook 208 contains several multi-stage speech codebooks 230*a*-230*d*. In general, a speech encoding system maintains one speech codebook 230 for each voicing pattern entry 220 in the voicing codebook 204. According to one embodiment, the voicing entry 220*a*-220*d* selected from the voicing codebook 204 determines which speech codebook 230*a*-230*d* is used to identify speech sounds. For example, to recognize speech sounds in a voiced-voiced sequence of frames, the matcher 112 utilizes the "voiced-voiced" (vv) codebook 230*a*. Similarly, to recognize speech sounds in an unvoiced-voiced sequence of frames, the matcher 112 utilizes the "unvoiced-voiced" (uv) codebook 230$c$. The vv-codebook 230$a$ is shown enlarged and expanded. This codebook 230$a$ includes three stage-codebooks 232, 234, and 236, each containing an integer number of entries. The multi-stage stage-codebooks 232-236 enable accurate identification of the speech signal with a fraction of the entries that would be necessary in a single-stage codebook system. According to the illustrative embodiment, each stage-codebook 232, 234, and 236 contains 8192 entries. According to alternative embodiments, the stage-codebooks 232, 234, and 236 may contain any number of entries. In various embodiments, the stage-codebooks contain 8, 16, 32, 64, 128, 256, 512, 1024, 2048, 4096, 8192, 16384, 32768, and 65536 entries. Additionally, each stage-codebook 232, 234, and 236 may contain a different number of entries.

An enlarged representation of each of the stage-codebooks 232, 234, and 236 is shown in FIG. 2C. The stage 1 stage-codebook 232 contains stage 1 entries 240$a$-240$z$ (generally "stage 1 entries 240"). The stage 2 stage-codebook 234 contains stage 2 entries 244$a$-244$z$ (generally "stage 2 entries 244"). The stage 3 stage-codebook 236 contains stage 3 entries 248$a$-248$z$ (generally "stage 3 entries 248"). According to the illustrative embodiment, each stage 1 entry 240, each stage 2 entry 244, and each stage 3 entry 248 includes a speech parameter vector, similar to the noise parameter vectors described above with respect to the noise codebook entry 212$b$. According to another embodiment, each stage 1 entry 240, each stage 2 entry 244, and each stage 3 entry 248 includes a segment of a waveform representing a sound, for example a speech sound.

According to one embodiment, each speech codebook entry 240, 244, and 248 represents a plurality of frames of speech. A frame represents a segment of a waveform of a sound signal, and in some embodiments, a frame includes the waveform segment. According to one embodiment, the plurality of frames represented by each entry 240, 244, and 248 is a reference frame sequence, and is derived from an allowable sequence of at least two frames. According to one embodiment, each speech codebook entry 240, 244, and 248 represents a spectral trajectory, wherein a spectral trajectory is the sequence of spectra that model the plurality of frames. In various embodiments, each speech codebook entry 240, 244, and 248 represents 2, 4, 8, 10, 15, 20, 30, 40, or 50 frames of speech. In a preferred embodiment, each codebook entry 240, 244, and 248 represents four frames of speech.

Each entry in the stage-2 speech codebook 234 represents a possible perturbation of any entry 240 in the stage-1 speech codebook 232. According to one implementation, in which each entry 240 and 244 represents a spectral trajectory, a selected stage-1 codebook entry, e.g. stage-1 codebook entry 240$m$, is combined with a selected stage-2 codebook entry, e.g. stage-2 codebook entry 244$n$, by combining the corresponding spectra of the entries 240$m$ and 244$n$. For example, if $g1(\theta)$ is the spectrum of the $k^{th}$ frame from stage-1 codebook entry 240$m$ and $g2(\theta)$ is the spectrum of the $k^{th}$ frame from stage-2 codebook entry 244$n$, their product, $g1(\theta)*g2(\theta)$, for each k, provides the combined speech spectral trajectory.

In one implementation, the spectra of a spectral trajectory are represented using 257 samples of the log-spectrum:

$$g_p = \log g(2*\pi*p/512) \text{ for } p=0, 1, \ldots, 256$$

where the samples are taken at equally spaced frequencies $\theta=2*\pi*p/512$ from $p=0$ to $p=256$. Thus, for a spectral trajectory including three frames, the stage-codebook entry 240, 244, or 248 is a vector of 3*257 values representing a sequence of 3 log-spectra. By storing these log-values in each stage-codebook 232, 234, and 236, a vector from the stage-1 codebook 232 may be summed with a vector from the stage-2 codebook to create a vector of 3*257 values representing a sequence of 3 log-spectra. The sequence of spectra can be obtained from these log-spectra by exponentiation; this yields a vector of 3*257 nonnegative values. Each group of 257 nonnegative values can be converted into a sequence of autocorrelation values, as described further in relation to FIG. 5.

This process may be repeated with the stage-3 codebook entries 248. The vector from the stage-1 codebook entry 240$m$ may be summed with the vector from the stage-2 codebook entry 244$n$ and the vector from the stage-3 codebook entry 248$p$ to yield a vector of 3*257 values representing a sequence of three log-spectra.

Figure 5:
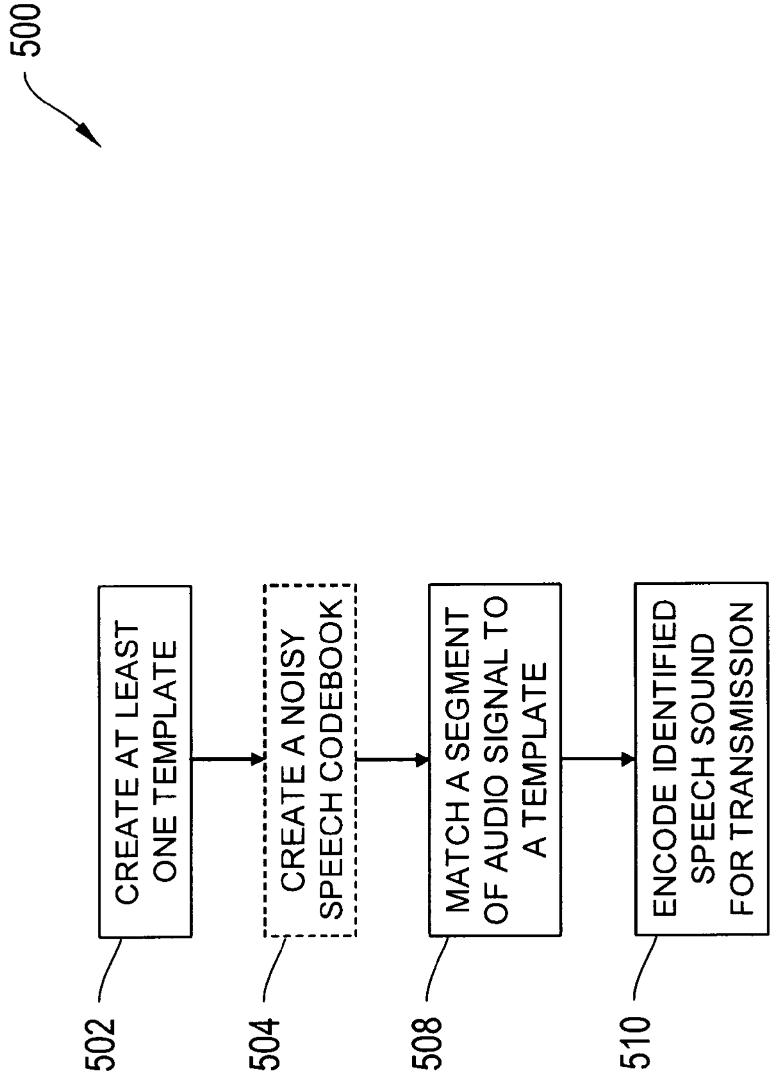
FIG. 5 is a flow chart of a method of encoding speech, according to an illustrative embodiment of the invention.

As described in greater detail with respect to FIG. 5, the matcher 112 uses the stage-codebooks 232, 234, and 236 in conjunction with the noise codebook 202 to derive the best speech codebook entry match. In one implementation, the matcher 112 combines the parameter vectors of corresponding frames of selected stage-1 entry 240$m$, stage-2 entry 244$n$, and stage-3 entry 248$p$ from each stage codebook 232, 234, and 236, and creates a single speech spectrum parameter vector for each corresponding frame.

To take into account noise obscuring the speech sounds in the input signal, the matcher 112 compares segments of the audio signal with noisy speech templates instead of comparing segments to the speech stage-codebooks 232, 234, and 236 directly. To create a noisy speech template, the frames of a noise codebook entry are combined with the corresponding combined frames of speech stage 1 codebook entries 240, stage 2 codebook entries 244, and stage 3 codebook entries 248. According to one embodiment, the frames include sound signal waveforms, and a noisy speech template includes a sound signal waveform. According to another embodiment, the parameter vector 214 of a noise codebook entry 212 and the parameter vector of the combined stage-1 codebook entry 240, stage-2 codebook entry 244, and stage-3 codebook entry 248, are converted to autocorrelation parameter vectors, as described in further detail with respect to FIG. 5. According to one implementation, the autocorrelation parameters are combined to form a frame of the noisy speech template. Noisy speech templates are stored in noisy speech codebooks.

Figure 3:
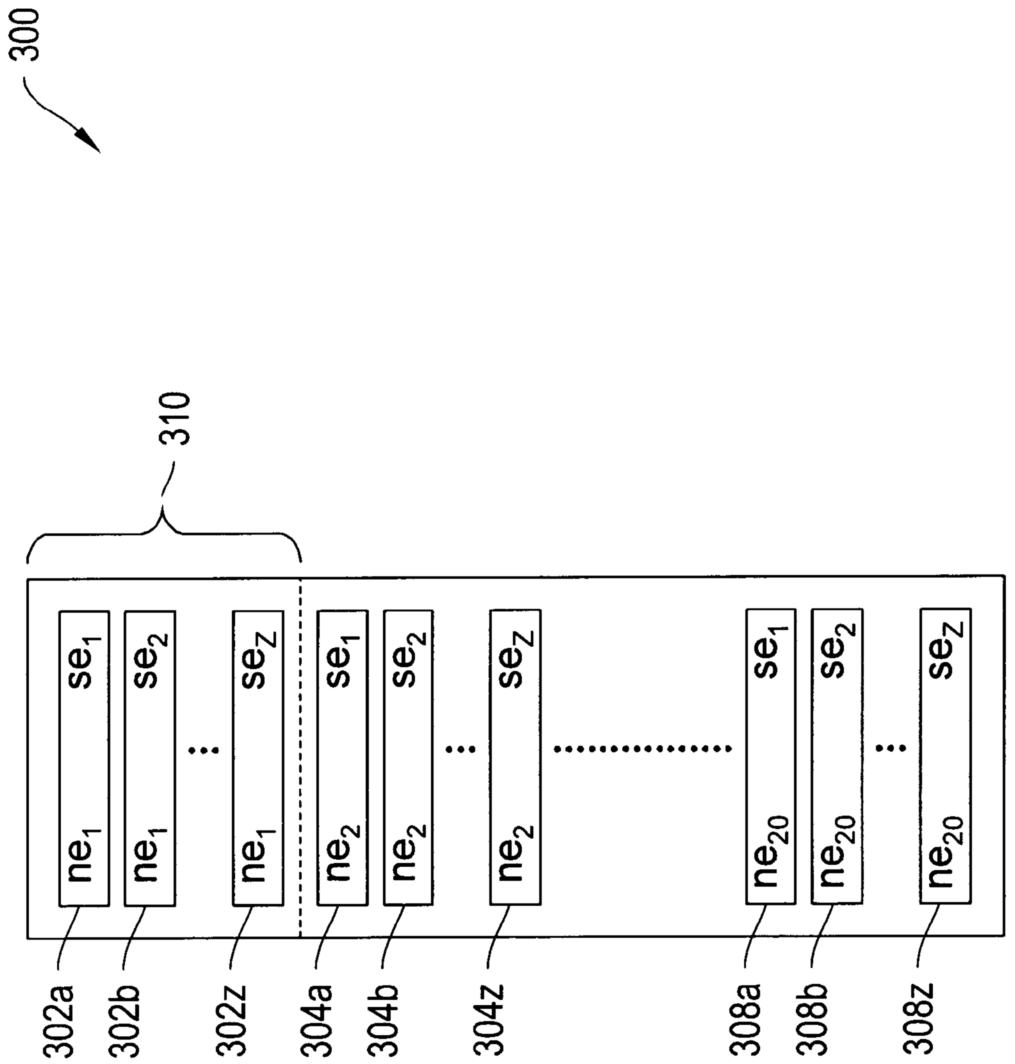
FIG. 3 is a diagram of a noisy speech codebook, according to an illustrative embodiment of the invention.

According to one embodiment, a plurality of noisy speech templates are generated and stored in a noisy speech codebook. FIG. 3 is a conceptual diagram of one such noisy speech codebook 300. The noisy speech codebook 300 contains templates 302$a$-302 $z$, 304$a$-304$z$, and 308$a$-308$z$, where each template is a noisy speech codebook entry. Templates 302$a$-302$z$ are created as a function of a first noise codebook entry (ne1) and the entries (se1, se2, . . . , sen) of the speech codebook, templates 304$a$-304$z$ are created as a function of a second noise codebook entry (ne2) and the entries (se1, se2, . . . , sen) of the speech codebook, and templates 308$a$-308$z$ are created as a function of a twentieth noise codebook entry (ne20) and the entries (se1, se2, . . . , sen) of the speech codebook.

According to one embodiment, a noisy speech template is created for each stage-codebook entry 240, 244, and 248. According to the illustrative embodiment, the noisy speech codebook 300 is generated by combining the autocorrelation vectors of a selected sequence of noise codebook entries with the autocorrelation vectors of each frame of a speech codebook entry. However, according to alternative embodiments, the speech encoding system 100 maintains separate noisy speech codebooks for each noise entry. These noisy speech codebooks may be updated by selecting a second noise codebook entry, and replacing each noisy speech codebook entry with a template generated by combining the second noise codebook entry with each speech codebook entry. As shown in FIG. 3, each template 302, 304, and 308 contains indexing information, including which noise codebook entry (ne1, ne2, . . . , ne20) and which speech codebook entry (se1, se2, . . . , sen) were combined to form the selected template. According to some embodiments, the templates 302*a*-302*z*, 304*a*-304*z*, and 308*a*-308*z* also contain indexing information for the voicing codebook entry used to form the selected template.

Figure 4:
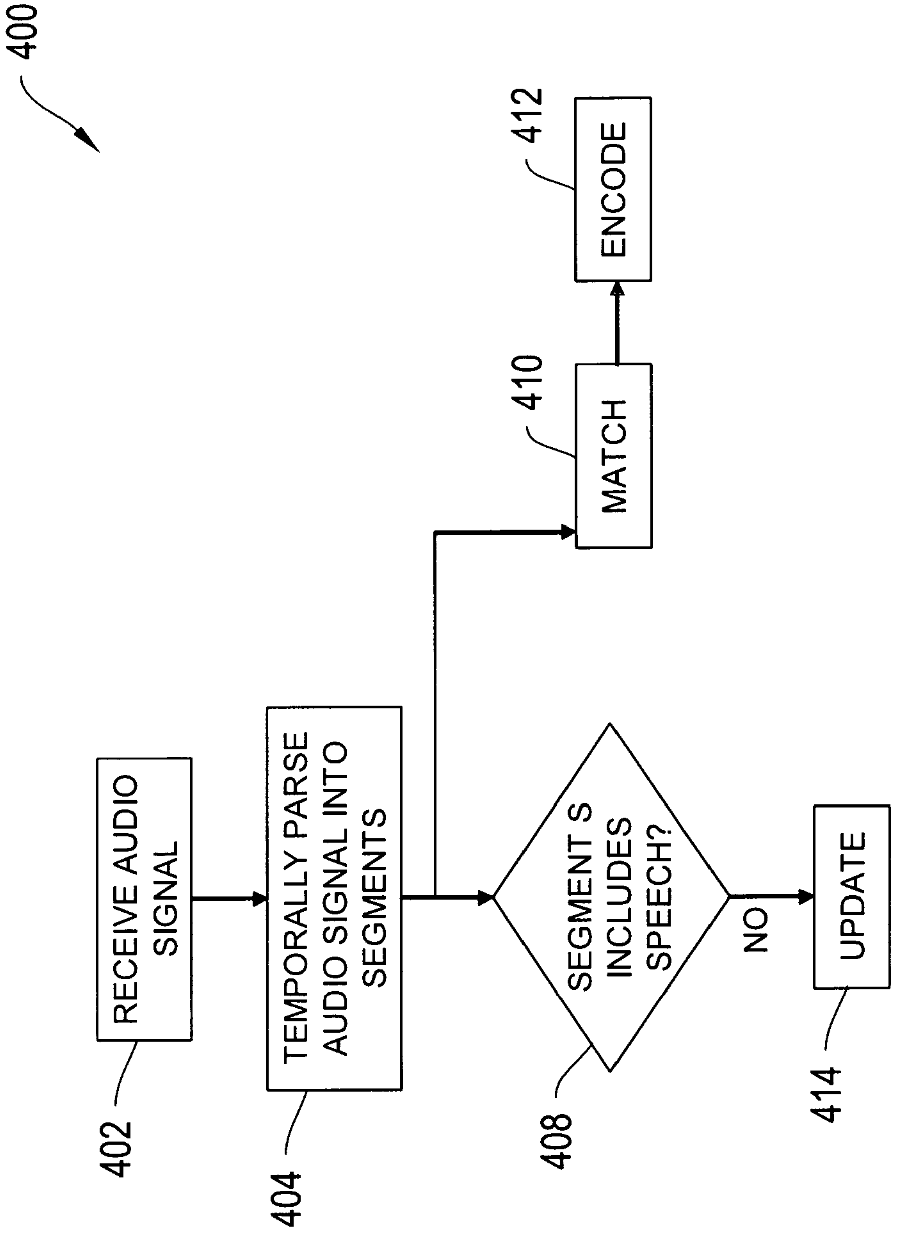
FIG. 4 is a flow chart of a method 400 of processing an audio signal, according to an illustrative embodiment of the invention.

FIG. 4 is a flow chart of a method 400 of processing an audio signal. The method 400 may be employed by a processor, such as the processor 114 of FIG. 1. The method 400 begins with receiving an audio signal (step 402). The audio signal includes noise and may include speech. A processor temporally parses the audio signal into segments (step 404). As mentioned above, each segment includes one or more frames. For a selected segment, the processor determines whether any of the frames of the segment includes speech (step 408). The segment is transferred to a matcher which identifies speech sounds (step 410), as described below with respect to FIG. 5. The matcher may be a part of the same processor, or it may be another processor. Once the audio signal is matched to a corresponding speech codebook entry, the speech codebook entry is encoded for transmission (step 412). If the segment does not include speech, it is used to update the noise codebook (step 414), as described in further detail with regard to FIG. 6.

FIG. 5 is a block diagram of a method 500 of encoding speech. The method may be employed in a speech analyzing system, such as a speech recognizer, a speech encoder, or a vocoder, upon receiving a signal containing speech. The method 500 begins with creating a noisy speech template (step 502).

Referring back to FIG. 2, a noisy speech template is created as a function of the parameter vector 214 of a noise codebook entry 212 and the parameter vector of a speech codebook entry. The parameter vectors are converted to autocorrelation parameter vectors, which are combined to form a frame of a noisy speech template.

An autocorrelation parameter vector is generated from a speech parameter vector. The nth autocorrelation value $r_n$ of an autocorrelation parameter vector G, may be calculated as a function of the spectrum g(θ) representing a frame of a speech codebook entry using the following formula:

$$r_n = \int_{-\pi}^{\pi} g(\theta) e^{in\theta} \frac{d\theta}{2\pi}$$

The autocorrelation parameter vector G has a length N, where N is the number of samples in the frame represented by g(θ). Similarly, for a noise codebook entry 212, the nth autocorrelation value $q_n$ of an autocorrelation parameter vector M, may be calculated as a function of the spectrum μ(θ) representing the frame of the noise-codebook entry 212, using the following formula:

$$q_n = \int_{-\pi}^{\pi} \mu(\theta) e^{in\theta} \frac{d\theta}{2\pi}$$

The autocorrelation parameter vector M also has a length N, where N is the number of samples in the frame represented by μ(θ).

According to one implementation, a frame of a noisy-speech template autocorrelation parameter vector S is the sum of a speech entry autocorrelation parameter vector G and a noise entry autocorrelation parameter vector M:

$$S=G+M$$

According to a further embodiment, the spectrum s(θ) representing a frame of a noisy-speech template may be calculated as the sum of the spectrum g(θ) representing a frame of a speech-codebook entry and the spectrum μ(θ) representing the frame of a noise codebook entry.

$$s(\theta)=g(\theta)+\mu(\theta)$$

Optionally, the noisy speech templates may be aggregated to form a noisy speech codebook (step 504), as described in relation to FIG. 3.

Next, a processor matches a segment of the audio signal containing speech to a noisy speech template (step 508), thereby identifying the speech sound.

Referring to FIGS. 2 and 5, to match the segment of the audio signal (step 508), the matcher 112 employs the noisy speech codebook 300, derived from the stage-codebooks 232, 234, and 236 as follows. The matcher 112 uses the stage-codebooks 232, 234, and 236 sequentially to derive the best noisy speech template match. According to this embodiment, each stage-codebook entry 240, 244, and 248 represents a plurality of frames, and thus represents a spectral trajectory. Each noise entry 212 represents one spectrum. First, the matcher 112 compares the noisy speech templates derived from the noise entries 212 and the stage 1 entries 240 to a segment of the input signal (i.e. one or more frames). The noisy speech template that most closely corresponds with the segment, e.g. the template derived from the frames of the stage-1 entry 240*m* and a plurality of noise entries 212, is selected.

Next, the stage 2 stage-codebook 234 is used. The matcher 112 combines each stage 2 entry 244 with the selected stage 1 entry 240*m*, creates noisy speech templates from this combination and the selected noise entries 212, and matches the noisy speech templates to the segment. The matcher 112 identifies and selects the noisy speech template used in forming the best match, e.g. the template derived from the combination of stage 1 entry 240*m*, stage 2 entry 244*n*, and the selected noise entries 212.

Last, the stage 3 stage-codebook 236 is used. The matcher 112 combines each stage 3 entry 248 with the selected stage 1 entry 240*m* and stage 2 entry 244*n*, creates noisy speech templates from this combination and the noise entries 212 and matches the noisy speech templates to the segment. The matcher 112 identifies and selects the noisy speech template, used in forming the best match, e.g. the template derived from stage 1 entry 240*m*, stage 2 entry 244*n*, stage 3 entry 248*p*, and the selected noise entries 212. According to other embodiments, the matcher 112 may select a plurality of noisy speech templates derived from the entries from each stage-codebook 232, 234, and 236, combining the selected entries from one stage with each entry in the subsequent stage. Selecting multiple templates from each stage increases the pool of templates to choose from, improving accuracy at the expense of increased computational cost.

According to one embodiment, to match a segment of the audio signal to an entry in the speech codebook 208 (step 508), the matcher 112 uses stage-codebooks 232, 234, and 236 sequentially, along with the noise codebook 202, to derive the best noisy speech template match. According to this embodiment, each stage-codebook entry 240, 244, and 248 represents a plurality of frames, thus representing a spectral trajectory. Each noise codebook entry 212 represents a single frame, and thus a single spectrum. Therefore, at least one noise codebook entry spectrum is identified and selected for each frame of a stage-codebook entry. According to one embodiment, a plurality of noise codebook entries are identified and selected. For example, 2, 4, 5, 12, 16, 20, 24, 28, 32, 36, 40, 45, 50, or more than 50 noise codebook entries may be identified and selected.

The matcher 112 begins with a first stage-1 codebook entry, e.g. stage-1 codebook entry 240*a*, which may represent a four-spectrum (i.e. four frame) spectral trajectory. For the first speech spectrum in the stage-1 codebook entry 240*a*, the matcher 112 creates a set of noisy speech spectra by combining the first speech spectrum with the noise spectrum of each noise entry 212 in the noise codebook 202. The matcher 112 compares each of these noisy speech spectra to the first frame in the audio signal segment, and computes a frame-log-likelihood value (such as the frame log-likelihood value, discussed below) for each noisy speech spectrum. The frame-log-likelihood value indicates how well the computed noisy speech spectrum matches the first frame of the segment. Based on the frame-log-likelihood values, the matcher 112 determines which noise spectrum yields the highest frame-log-likelihood value for the first frame of the first speech codebook entry 240*a*. In another embodiment, the matcher 112 identifies a plurality of noise spectra which yield the highest frame-log-likelihood values for the first frame of the first speech codebook entry 240*a*. For example the matcher 112 may identify 4, 8, 12, 16, 20, 24, 28, 32, 36, 40, or more than 40 noise spectra which yield the highest frame-log-likelihood values.

The matcher 112 repeats this process for each frame in the spectral trajectory of the first stage-1 codebook entry 240*a* and each corresponding frame of the input audio signal segment, determining which noise spectrum yields the highest frame-log-likelihood value for each frame. The matcher 112 sums the highest frame-log-likelihood value of each frame of the first stage-1 codebook entry 240*a* to yield the segment-log-likelihood value. The first stage-1 codebook entry 240*a* segment-log-likelihood value indicates how well the audio segment matches the combination of the speech spectral trajectory of the first stage-1 codebook entry 240*a* and the selected noise spectral trajectory that maximizes the segment-log-likelihood.

The matcher 112 repeats this process for each stage-1 codebook entry 240, generating a segment-log-likelihood value and a corresponding noise spectral trajectory for each stage-1 codebook entry 240. The matcher 112 selects the stage-1 codebook entry 240-noise spectral trajectory pairing having the highest segment-log-likelihood value. According to another embodiment, the matcher 112 selects the plurality of stage-1 codebook entry 240-noise spectral trajectory pairing having the highest segment-log-likelihood values.

After selecting a stage-1 codebook entry-noise spectral trajectory pairing, the matcher 112 proceeds to the stage-2 speech codebook 234. The matcher 112 calculates new spectral trajectories by combining the selected stage-1 codebook entries with each of the stage-2 codebook entries. Using the noise spectral trajectory selected above, the matcher 112 calculates a segment-log-likelihood value for each of the combined spectral trajectories, and selects the stage-2 codebook entry 244 that yields the combined spectral trajectory having the highest segment-log-likelihood value. This represents the "best" combination of stage-1 codebook 232 and stage-2 codebook 234 spectral trajectories. The matcher 112 repeats this process for the stage-3 codebook 236, combining each stage-3 codebook entry 248 with the combination of the selected stage-1 entry 240, stage-2 entry 244, and noise trajectory entries. The received speech sounds can be uniquely identified by the selected stage-1, stage-2, and stage-3 codebooks, the noise codebook entries 212 corresponding to the selected noise trajectory, and the voicing codebook entries 220, which, when combined together, create a noisy speech template.

According to another embodiment, the matcher 112 identifies a plurality of noise spectral trajectories for each speech spectral trajectory (SST) of the stage-1 codebook entries 240. In one example, for each stage-1 codebook entry 240, the matcher 112 identifies a plurality of noise spectral trajectories from among all the noise spectral trajectories that may be generated from the t active entries 212 in the noise spectral codebook 202. The identified plurality of noise spectral trajectories yield the largest values of the discriminant function:

$$\hat{F}_p(x)=\ln p(x|h_p)+\ln P(h_p)$$

where x is the received audio signal, $h_p$ is the hypothesis that the combination of a noise spectral trajectory and the selected stage-1 codebook entry 240 match the received sound, $p(x|h_p)$ is the probability density function of the observation of x given that the hypothesis $h_p$ is true, and $P(h_p)$ is the probability of $h_p$ being true. Thus, in an embodiment in which each stage-1 codebook entry 240 includes four frames, this method compares $t^4$ stage-1 codebook entry 240-noise spectral trajectory pairings. According to various embodiments, the matcher 112 identifies between 2 and 128 noise spectral trajectories that yield the largest values of the discriminant function, and may identify, for example, 4, 8, 12, 16, 24, 32, 40, 48, 64, 96, 128, between 2 and 128, or more than 128 noise spectral trajectories. In another example, the matcher 112 identifies one noise spectral trajectory which maximizes the discriminant function.

Given an embodiment in which each stage-1 codebook entry 240 includes four frames, and there are t noise entries in the noise codebook, these t entries may be combined with the four frames to form 4t noisy speech template hypotheses. The frame-level discriminant value for each noisy speech template frame is given by:

$$F(k,j)=L(x_k|s_{kj})+N_k\ln(P_j)$$

for k=1, 2, 3, 4 (frames) and j=1, 2, . . . t, where L is the log-likelihood, $x_k$ is the received audio signal for the k-th frame, s is the selected noisy speech template, $N_k$ is the number of samples in the k-th frame of the received audio signal, and $P_j$ is the prior probability of the j-th noise entry (which may be estimated from the count associated with the j-th noise entry). Thus, for a four frame speech spectral trajectory, the discriminant value of the four frame noisy speech template is of the form:

$$F(1,j_1)+F(2,j_2)+F(3,j_3)+F(4,j_4)$$

where the selected indices $j_1, j_2, j_3, j_4 \in \{1, 2, \ldots, t\}$ specify the selected noise spectral trajectory. A search algorithm (as described below) may then be used to determine index vectors $(j_1, j_2, j_3, j_4)$ representing the selected plurality M of noise spectral trajectories which yield the largest values of the discriminant value of the four frame noisy speech template (or the block discriminant value) without explicitly calculating and sorting $t^4$ possible discriminant values.

The search algorithm includes arranging the 4t frame-level discriminant values F(k,j) in a matrix with 4 columns and t rows. Each column of the matrix is sorted such that the largest values are at the top of each column. Additionally, the search algorithm maintains a "C-list" of candidate index vectors.

The C-list is initialized with the index vector (1, 1, 1, 1), which, because the matrix columns are sorted, corresponds to the largest possible block discriminant value. The search algorithm also maintains a "T-list" which initially has no entries. The T-list will eventually hold the selected M index vectors. The search algorithm then iterates the following four steps. First, the top index vector entry in the C-list is moved to the bottom of the T-list. Next, four new candidate index vectors are generated by incrementing each component of the previous "top" index vector (e.g., from (1, 1, 1, 1), four new index vectors are generated: (2, 1, 1, 1), (1, 2, 1, 1), (1, 1, 2, 1), and (1, 1, 1, 2). These four new candidate index vectors are sorted and inserted into the C-list such that it remains sorted with those candidate index vectors that correspond to the largest block discriminant values at the top. Next, the C-list is truncated if it has more than the selected number M of entries. In an embodiment in which the top M entries are sought, the search algorithm is repeated M times, after which the T-list has the M index vectors that yield the largest values of the block discriminant.

According to various embodiments, the search algorithm may be used to select any number M of index vectors, including, for example, 1, 2, 4, 8, 12, 16, 20, 24, 28, 40, 48, 56, 64, 128, between 1 and 128, or more than 128 index vectors. Additionally, the speech spectral trajectories and noisy speech templates may include any selected number P of frames, and thus, the number P of columns in the matrix may vary to correspond to the number of frames. For example, the matrix may include 2, 3, 6, 8, 10, 12, 16, 20, 24, 28, 32, between 1 and 32, or more than 32 columns.

The search algorithm described above increases the computational efficiency of calculating the M noisy speech templates that maximize the block discriminant. According to one example, calculating and sorting all $t^P$ block discriminant values includes on the order of $t^P \log(t^P)$ operations, while the described search algorithm includes on the order of $M^2P^2+tP \log(t)$ operations.

According to one embodiment, the speech spectral trajectory frames, the noise spectral trajectory frames, and the noisy speech template frames may each be divided into low-band and high-band spectral pairs. When combined, the low-band and high-band spectral pairs result in wideband spectra. As mentioned above, the matcher 112 can calculate the likelihood that a noisy speech template matches a frame of an audio signal by employing a Hybrid Log-Likelihood Function ($L_h$) (step 508). This function is a combination of the Exact Log-Likelihood Function ($L_e$) and the Asymptotic Log-Likelihood Function ($L_a$). The Exact function is computationally expensive, while the alternative Asymptotic function is computationally cheaper, but yields less exact results. The Exact function is:

$$L_e(x|s) = -\frac{1}{2}x'R^{-1}x - \frac{1}{2}\ln|2\pi R|$$

where R is a Symmetric Positive-Definite (SPD) covariance matrix and has a block-Toeplitz structure, x is the frame of noisy speech data samples, and s is the hypothesized speech-plus-noise spectrum. The function includes a first part, before the second minus-sign, and a second part, after the second minus-sign. According to one embodiment including a single input signal, R may be a Toeplitz matrix. According to alternative embodiments including a plurality of input signals, R is a block-Toeplitz matrix as described above. The Asymptotic function is:

$$L_a(x|s) = -\frac{N}{2}\int_{-\pi}^{\pi} tr[f(\theta)s(\theta)^{-1}] + \ln|2\pi s(\theta)|\frac{d\theta}{2\pi}$$

According to one embodiment, including a single input signal, the term "$tr[f(\theta)s(\theta)^{-1}]$" is replaced with the term "$f(\theta)s(\theta)^{-1}$". According to one feature, the Asymptotic function shown above is used in embodiments including a plurality of input signals. The Asymptotic function also includes two parts: a first part before the plus-sign, and second part after the plus-sign. The part of the Asymptotic function before the plus corresponds to the first part of the Exact function. Similarly, the part of the Asymptotic function after the plus corresponds to the second part of the Exact function. Combining the first part of the Exact function, for which a known algorithm (the Preconditioned Conjugate Gradient algorithm) reduces the computation cost, with the second part of the Asymptotic function (which can be evaluated using a Fast Fourier Transform) yields the Hybrid Log-Likelihood Function $L_h$:

$$L_h(x|s) = -\frac{1}{2}x'R^{-1}x - \frac{N}{2}\int_{-\pi}^{\pi}\ln|2\pi s(\theta)|\frac{d\theta}{2\pi}$$

This hybrid of the two algorithms is less expensive computationally, without yielding significant loss in performance.

After the matcher has matched a segment of the audio signal to a template, the identified speech sound is digitally encoded for transmission (step 510). According to one implementation, only the index of the speech codebook entry, or of each stage-codebook entry 240, 244, and 248, correlated to the selected noisy speech template, as described above, is transmitted. Additionally, the index of the voicing codebook entry of the selected template may be transmitted. Thus, the noise codebook entry information may not be transmitted. Segments of the audio signal absent of voiced speech may represent pauses in the speech signal or could include unvoiced speech. According to one embodiment, these segments are also digitally encoded for transmission.

Figure 6:
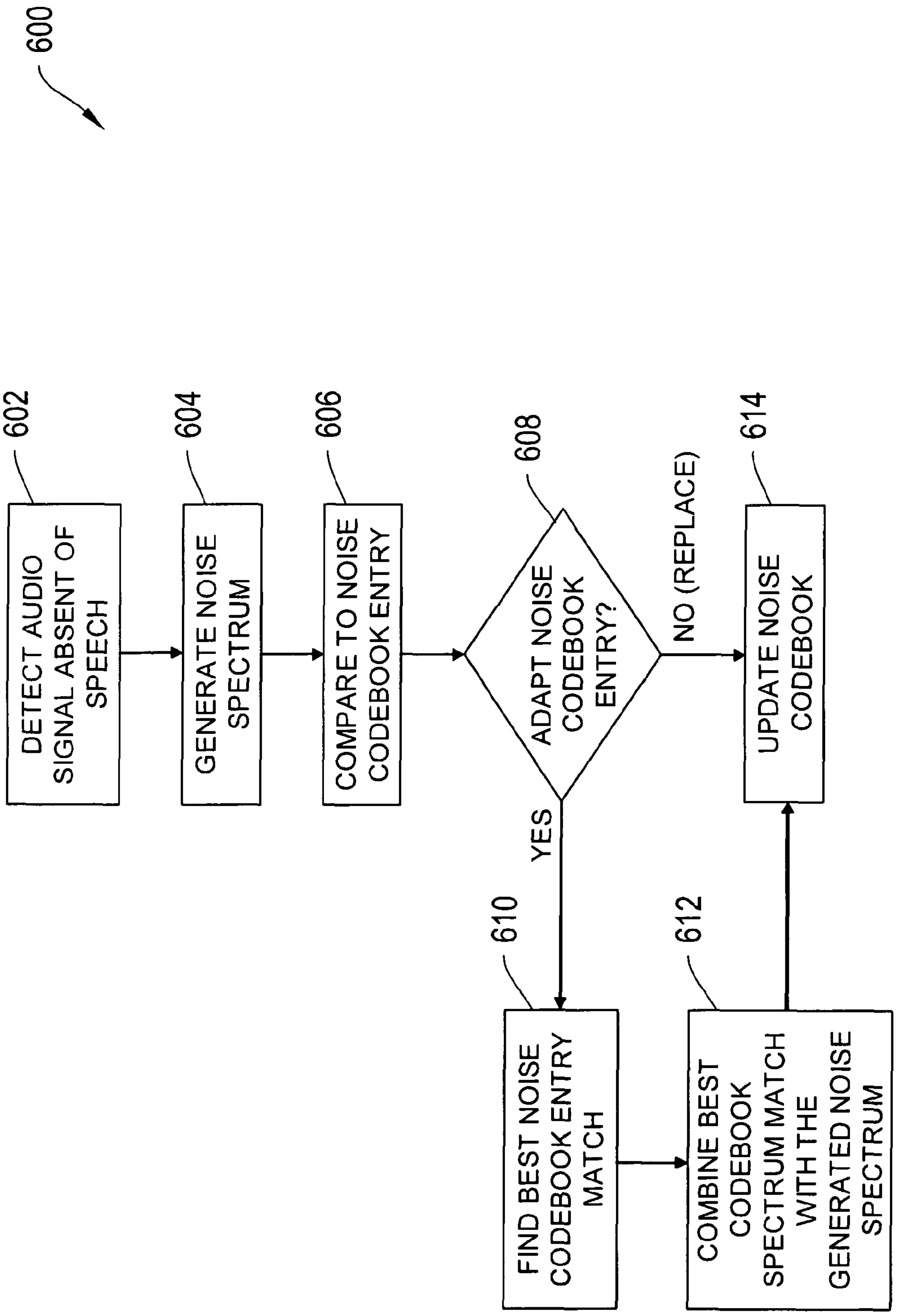
FIG. 6 is a flow chart of a method of updating a noise codebook entry, according to an illustrative embodiment of the invention.

FIG. 6 is a block diagram of a method 600 of updating a noise codebook entry. The method 600 may be employed by a processor, such as the processor 114 of FIG. 1. The method 600 begins with the matcher detecting a segment of the audio signal absent of speech (step 602). The segment is used to generate a noise spectrum parameter vector representative of the segment (step 604). According to one embodiment, the noise spectrum parameter vector represents an all-pole spectral estimate computed using an $80^{th}$-order Linear Prediction (LP) analysis.

The noise spectrum parameter vector is then compared with the parameter vectors 214 of one or more of the noise codebook entries 212 (step 606). According to one embodiment, the comparison includes calculating the spectral distance between the noise spectrum parameter vector of the analyzed segment and each noise codebook entry 212.

Based on this comparison, the processor determines whether a noise codebook entry will be adapted or replaced (step 608). According to one embodiment, the processor compares the smallest spectral distance found in the comparison to a predetermined threshold value. If the smallest distance is below the threshold, the noise codebook entry corresponding to this distance is adapted as described below. If the smallest distance is greater than the threshold, a noise codebook entry parameter vector is replaced by the noise spectrum parameter vector.

If a noise codebook entry 212 will be adapted, the processor finds the best noise codebook entry match (step 610), e.g. the noise codebook entry 212 with the smallest spectral distance from the current noise spectrum. The best noise codebook entry match is combined with the noise spectrum parameter vector (step 612) to result in a modified noise codebook entry. According to one embodiment, autocorrelation vectors are generated for the best noise codebook entry match and the noise spectrum parameter vector. The modified codebook entry is created by combining 90% of the autocorrelation vector for best noise codebook entry match and 10% of the autocorrelation vector for the noise spectrum parameter vector. However, any relative proportion of the autocorrelation vectors may be used. The modified noise codebook entry replaces the best noise codebook entry match, and the codebook is updated (614).

Alternatively, a noise codebook entry parameter vector may be replaced by the noise spectrum parameter vector (step 608). According to another embodiment, the noise codebook entry is updated (step 614) by replacing the least frequently used noise codebook entry 212. According to a further embodiment, the noise codebook entry is updated (step 614) by replacing the least recently used noise codebook entry. According still another embodiment, the noise codebook entry is updated by replacing the least recently updated noise codebook entry.

FIG. 7 shows three tables with exemplary bit allocations for signal encoding. According to one illustrative embodiment, shown in table 700, a 180 ms segment of speech may be encoded in 54 bits. The selected voicing codebook entry index is represented using 15 bits, while the selected speech codebook entry index (using the 3-stage speech codebook described above with respect to FIG. 2) is encoded using 39 bits (e.g. 13 bits for each stage-codebook entry). This results in a signal that is transmitted at 300 bits per second (bps). A similar encoding, shown in table 730, may be done using a 90 ms segment of speech, resulting in a signal that is transmitted at 600 bps. According to another embodiment, shown in table 760, a 90 ms segment of speech may be encoded in 90 bits, resulting in a signal that is transmitted at 1000 bps. This may be a more accurate encoding of the speech signal. In this embodiment, a 6-stage speech codebook is used, and 75 bits are used to encode the selected speech codebook entry index. The voicing codebook entry index is encoded using 15 bits. According to some embodiments, the voicing codebook entry index is encoded using 2, 5, 10, 25, 50, 75, 100, or 250 bits. According to other embodiments, the plurality of bits used to encode the speech codebook entry index includes 2, 5, 10, 20, 35, 50, 100, 250, 500, 1000, 2500, or 5000 bits.

According to one implementation, the signal may be encoded at a variable bit-rate. For example, a first segment may be encoded at 600 bps, as described above, and a second segment may be encoded at 300 bps, as described above. According to one configuration based on fixed duration segments composed of two frames, the encoding of each segment is determined as a function of the voicing properties of the frames. If it is determined that both frames of the segment are unvoiced and likely to be speech absent, a 2-bit code is transmitted together with a 13-bit speech codebook entry index. If it is determined that both frames are unvoiced and either frame is likely to have speech present, a different 2-bit code is transmitted together with a 39-bit speech codebook entry index. If at least one of the two frames is determined to be voiced, a 1-bit code is transmitted together with a 39-bit speech codebook entry index and a 14-bit voicing codebook entry index.

This encoding corresponds to one implementation of a variable-bit-rate vocoder which has been tested using 22.5 ms frames and yields an average bit rate of less than 969 bps. According to this implementation, about 20% of segments were classified as "unvoiced-unvoiced" and likely speech-absent, about 20% of segments were classified as "unvoiced-unvoiced" and likely speech-present, and about 60% of segments were classified as "voiced-unvoiced," "unvoiced-voiced," or "voiced-voiced." Using the bit rates described above, and calculating the average occurrence of each type of segment, this results in an average of 3+8.2+32.4=43.6 bits per 45 ms segment, or less than 969 bps.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which interpreted as broadly as allowed under the law.

What is claimed is:

1. A method for processing a signal, comprising the steps of:

receiving an input sound signal including speech and environmental noise;

temporally parsing the input sound signal into input frame sequences of at least three input frames, wherein an input frame represents a segment of a waveform of the input sound signal;

providing a speech codebook including a plurality of entries corresponding to speech spectral trajectories of reference frame sequences that include at least three reference frames, wherein a reference frame represents a segment of a waveform of a reference sound signal, wherein the reference frame sequence corresponding to the entries are derived from allowable sequences of at least three reference frames, and wherein the speech codebook substantially lacks entries corresponding to (1) reference frame sequences that include a single unvoiced frame between a pair of voiced frames, and (2) reference frame sequences that include a single voiced frame between a pair of unvoiced frames;

identifying phones within the speech based on a comparison of an input frame sequence with a plurality of the speech spectral trajectories of reference frame sequences; and encoding the phones.

2. The method of claim 1, wherein the segment of the waveform represented by an input frame is represented by a spectrum.

3. The method of claim 1, wherein the segment of the waveform represented by a reference frame is represented by a spectrum.

4. The method of claim 1, wherein an input frame includes the segment of the waveform of the input sound signal it represents.

5. The method of claim 1, wherein a reference frame includes the segment of the waveform of the reference sound signal that it represents.

6. The method of claim 1, comprising identifying pitch values of the at least two input frames.

7. The method of claim 6, comprising encoding the identified pitch values.

8. The method of claim 1, comprising providing a noise codebook including a plurality of noise codebook entries corresponding to frames of environmental noise;

selecting at least one noise sequence of noise codebook entries; and identifying phones based on a comparison of at least one of the input frame sequences with the at least one noise sequence.

9. The method of claim 8, wherein the at least one noise sequence comprises a first noise codebook entry and a second noise codebook entry.

10. The method of claim 9, wherein the first noise codebook entry and the second noise codebook entry are the same noise codebook entry.

11. The method of claim 8, wherein selecting comprises:

calculating frame-level discriminant values for the noise code book entries;

creating a matrix having a plurality of matrix entries including the frame-level discriminant values; and identifying, in respective columns of the matrix, a matrix entry having the largest frame-level discriminant value.

12. The method of claim 1, wherein the at least two input frames are temporally adjacent portions of the input sound signal.

13. The method of claim 1, comprising determining the set of allowable sequences based on sequences of phones that are formable by the average human vocal tract.

14. The method of claim 1, comprising determining the set of allowable sequences based on sequences of phones that are permissible in a selected language.

15. The method of claim 14, wherein the selected language is English.

16. The method of claim 1, comprising creating the at least two input frames from temporally overlapping portions of the input sound signal.

17. The method of claim 1, comprising creating the reference spectral sequences from frames derived from overlapping portions of a speech signal.

18. The method of claim 1, wherein the parsing comprises parsing the input sound signal into variable length frames.

19. The method of claim 18, wherein at least one of the variable length frames corresponds to a phone.

20. The method of claim 18, wherein at least one of the variable length frames corresponds to at least one of a phone and a transition between phones.

21. The method of claim 1, wherein the input sound signal is temporally parsed into frame sequences of one of at least 3 frames, at least 5 frames, at least 7 frames, at least 9 frames, and at least 12 frames.

22. The method of claim 1, wherein encoding the phones comprises encoding the identified phones as a digital signal having a bit rate of less than 2500 bits per second.

23. A device comprising:

a receiver for receiving an input sound signal including speech and environmental noise;

a first processor for temporally parsing the input sound signal into input frame sequences of at least three input frames, wherein an input frame represents a segment of a waveform of the input sound signal;

a first memory for storing a plurality of speech codebook entries corresponding to speech spectral trajectories of reference frame sequences that include at least three reference frames, wherein a reference frame represents a segment of a waveform of a reference sound signal, wherein the reference frame sequence corresponding to the entries are derived from allowable sequences of at least three reference frames, and wherein the speech codebook substantially lacks entries corresponding to (1) reference frame sequences that include a single unvoiced frame between a pair of voiced frames, and (2) reference frame sequences that include a single voiced frame between a pair of unvoiced frames;

a second processor for identifying phones within the speech based on a comparison of an input frame sequence with a plurality of the speech spectral trajectories of reference frame sequences; and a third processor for encoding the phones.

24. The device of claim 23, wherein at least two of the first processor, the second processor, and the third processor are the same processor.

25. The device of claim 23, wherein the segment of the waveform represented by an input frame is represented by a spectrum.

26. The device of claim 23, wherein a the segment of the waveform represented by a reference frame is represented by a spectrum.

27. The device of claim 23, wherein an input frame includes the segment of the waveform of the input sound signal it represents.

28. The device of claim 23, wherein a reference frame includes the segment of the waveform of the reference sound signal that it represents.

29. The device of claim 23, comprising a second memory for storing a plurality of noise codebook entries corresponding to spectra of environmental noise;

a fourth processor for selecting at least one noise sequence of noise codebook entries; and wherein the second processor identifies phones within the speech based on a comparison of the spectra corresponding to a frame sequence with the at least one noise sequence.

30. The device of claim 23, comprising a fourth processor for identifying pitch values of the at least two input frames.

31. The device of claim 23, wherein the allowable sequences are based on sequences of phones predetermined to be formable by the average human vocal tract.

32. The device of claim 23, wherein allowable sequences are based on sequences of phones predetermined to be permissible in a selected language.

33. The device of claim 32, wherein the selected language is English.

34. The device of claim 23, wherein the first processor creates the at least two input frames from temporally adjacent portions of the input sound signal.

35. The device of claim 23, wherein the first processor creates the at least two input frames from temporally overlapping portions of the input sound signal.

36. The device of claim 23, wherein the reference frame sequences are from reference frames created from overlapping portions of a speech signal.

37. The device of claim 23, wherein the first processor parses the input sound signal into variable length input frames.

38. The device of claim 37, wherein at least one of the variable length input frames corresponds to a phone.

39. The device of claim 37, wherein at least one of the variable length input frames corresponds to at least one of a phone and a transition between phones.

40. The device of claim 23, wherein the first processor temporally parses the input sound signal into input frame sequences of one of at least 3 frames, at least 5 frames, at least 7 frames, at least 9 frames, and at least 12 frames.

41. The device of claim 23, wherein the third processor encodes phones as a digital signal having a bit rate of less than 2500 bits per second.

42. The method of claim 1, wherein non-allowable sequences are reference frame sequences that represent a waveform which is not typical of a speech signal.

43. The method of claim 1, wherein the comparison comprises determining a likelihood that the input frame sequence corresponds to one of the plurality of speech spectral trajectories of reference frame sequences.

44. The method of claim 1, further comprising generating a plurality of noise-corrupted versions of the plurality of the speech spectral trajectories of reference frame sequences using noise entries from a noise codebook, and wherein the comparison comprises comparing the input frame sequence with the noise-corrupted versions of the plurality of the speech spectral trajectories of reference frame sequences.

45. The device of claim 23, wherein the comparison comprises determining a likelihood that the input frame sequence corresponds to one of the plurality of speech spectral trajectories of reference frame sequences.

46. The device of claim 23, further comprising a fourth processor for generating a plurality of noise-corrupted versions of the plurality of the speech spectral trajectories of reference frame sequences using noise entries from a noise codebook, and wherein the comparison comprises comparing the input frame sequence with the noise-corrupted versions of the plurality of the speech spectral trajectories of reference frame sequences.

* * * * *